United States Patent
Liang et al.

(10) Patent No.: US 9,051,407 B2
(45) Date of Patent: Jun. 9, 2015

(54) POLYBUTADIENE GRAFTED ISOPRENE RUBBER, PROCESSES FOR PREPARING POLYBUTADIENE GRAFTED ISOPRENE RUBBER, MIXED COMPOSITIONS AND VULCANIZED FORMS THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Aimin Liang, Beijing (CN); Chuanqing Li, Beijing (CN); Wei Sun, Beijing (CN); Jie Zhang, Beijing (CN); Lin Xu, Beijing (CN); Ximing Xie, Beijing (CN); Guozhu Yu, Beijing (CN); Jiangwei Zhao, Beijing (CN); Yishuang Xin, Beijing (CN); Liangliang Yang, Beijing (CN); Jinmei Tan, Beijing (CN); Sufang Ouyang, Beijing (CN)

(73) Assignees: China Petroleum & Chemical Corporation, Beijing (CN); Beijing Research Institute Of Chemical Industry, China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 13/970,008

(22) Filed: Aug. 19, 2013

(65) Prior Publication Data
US 2014/0058044 A1    Feb. 27, 2014

(30) Foreign Application Priority Data
Aug. 21, 2012  (CN) .......................... 2012 1 0298780

(51) Int. Cl.
| C08F 279/02 | (2006.01) |
| C08F 253/00 | (2006.01) |
| C08L 51/04 | (2006.01) |
| C08F 279/00 | (2006.01) |

(52) U.S. Cl.
CPC ............. *C08F 279/02* (2013.01); *C08F 253/00* (2013.01); *C08L 51/04* (2013.01); *C08F 279/00* (2013.01)

(58) Field of Classification Search
CPC .... C08F 253/00; C08F 279/00; C08F 279/02; C08L 51/04
USPC .................................................. 525/313, 315
See application file for complete search history.

(56) References Cited

U.S. PATENT DOCUMENTS 4,418,185 A * 11/1983 Throckmorton et al. ...... 526/201
6,586,542 B2    7/2003 Jang et al.

FOREIGN PATENT DOCUMENTS

| CN | 1705687 A | 12/2005 |
| CN | 1884328 A | 12/2006 |
| EP | 0 942 004 A2 | 9/1999 |

OTHER PUBLICATIONS

English translation of CN 1705687 A, (2013).
English translation of CN 1884328 A, (2013).

* cited by examiner

*Primary Examiner* — Irina S Zemel
*Assistant Examiner* — Jeffrey Lenihan
(74) *Attorney, Agent, or Firm* — Finnegan, Henderson, Farabow, Garrett & Dunner, LLP

(57) ABSTRACT

Disclosed herein are polybutadiene grafted isoprene rubber, processes for preparing polybutadiene grafted isoprene rubber, mixed compositions and vulcanized forms thereof.

20 Claims, 1 Drawing Sheet

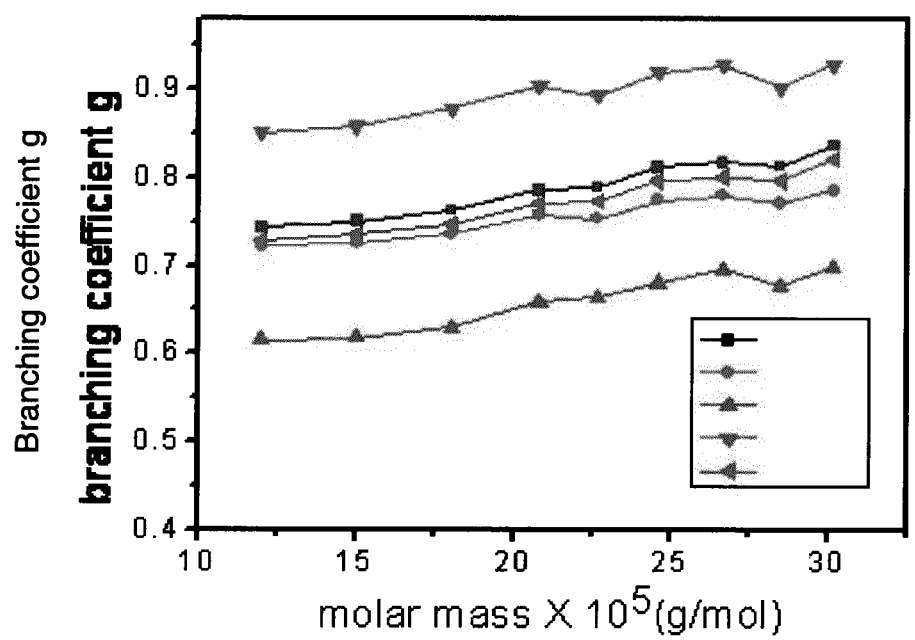

POLYBUTADIENE GRAFTED ISOPRENE RUBBER, PROCESSES FOR PREPARING POLYBUTADIENE GRAFTED ISOPRENE RUBBER, MIXED COMPOSITIONS AND VULCANIZED FORMS THEREOF

This application claims priority under 35 U.S.C. §119 to Chinese Patent Application No. 201210298780.3 filed Aug. 21, 2012, which is incorporated herein by reference in its entirety.

The present disclosure relates to polybutadiene grafted isoprene rubber, processes for preparing the polybutadiene grafted isoprene rubber, mixed compositions and vulcanized forms thereof.

In recent years, China's automobile and highway construction industries have experienced rapid growth. As a result, the demand for natural rubber has risen sharply. However, because most regions in China are subtropical, natural sources of rubber are inadequate to keep up with China's growing demand. Therefore, there is a great commercial need for novel synthetic rubber.

The microstructure and mechanical properties of rare earth isoprene rubber is the closest to that of natural rubber; as a result rare earth isoprene rubber can substitute natural rubber, in part or in entirety, in the production of rubber products. In addition, rare earth isoprene rubber has numerous advantages over natural rubber, e.g. resistance to sulfide and heat generation performance, etc. Another advantage over natural rubber is that rare earth isoprene doesn't require plasticization; thereby reducing energy consumption during the production process Despite the advantages of rare earth isoprene rubber over natural rubber, the commercialization of isoprene rubber has exposed some drawbacks. For example, during polymerization, the rare earth isoprene rubber becomes increasingly adverse to heat; thereby leading to liquid rubber with high viscosities during the late stages of the polymerization process. The high viscosities of the liquid rubber and the intrinsic cold flow characteristic of crude rubber complicate liquid transfer, storage and transportation.

It is known that the workability and usability of diolefin rubber can be improved by introducing branched chains into the linear structure of diolefin rubber. As the degree of branching increases, both the Mooney viscosity and the cold flow tendency of the polymer will decrease. In addition, the branching modification of diolefin rubber imparts other properties, for example, improved dispersity of the filler material in the base rubber material, etc.

Recently, branched diolefin rubber compositions with good physical and workability properties have been reported. For example, U.S. Pat. No. 6,586,542 B2 describes a method of utilizing dialkyl zinc as a conditioner to control the degree of branching of nickel-based cis-1,4-polybutadiene while maintaining its 1,4-structure content. Chinese patent document CN1884328A discloses a process for preparing highly branched vinyl polybutadiene rubber with a molybdenum-based catalyst; wherein the properties, length, distribution, and degree of branching of the branched chains are controllable within a certain range. Chinese patent document CN1705687A discloses a method for production of highly branched rare earth isoprene rubber that contains a high content of cis-1,4-structure, and is almost gel free by utilizing a metal halide as branching agent in the late stage of polymerization. The performance of the crude highly branched rare earth isoprene rubber prepared was found to be superior to that of commercial isoprene rubber, and equivalent to that of natural rubber. European patent document EP0942004A2 discloses the use of n-butyllithium to initiate anionic polymerization, resulting in the formation of branched polybutadiene and polyisoprene rubbers with high molecular weights, and controllable molecular weight distributions, glass transition temperatures (Tg), and vinyl content.

Surprisingly, the present inventors have found novel polybutadiene grafted isoprene rubber with good physical and workability properties, and processes for preparation of the novel polybutadiene grafted isoprene rubber, and mixed compositions and vulcanized forms thereof.

In-depth studies have been carried out on the presently disclosed polymerization process. It was discovered that utilizing polybutadiene according to the methods described herein can result in the formation of a branched polyisoprene product that has outstanding mechanical properties and a significantly decreased Mooney viscosity, i.e., the resulting branched polyisoprene product has favorable workability, and therefore the liquidity of the polymerized rubber liquid in the pipeline is greatly increased. As a result, the energy consumption required during the production process can be greatly decreased. In addition, the processes disclosed herein can be simple, easy to control, and allow for efficient and accurate control over the composition and molecular weight of the resulting polymer. Therefore, the processes disclosed herein are well suited for industrial applications.

Additional characteristics and advantages of the present disclosure will be further detailed in the embodiments disclosed herein.

In certain embodiments, disclosed herein is polybutadiene grafted isoprene rubber, comprising:

a) butadiene structural units in an amount ranging from about 0.5% to about 8% by weight; and b) isoprene structural units in an amount ranging from about 92% to about 99.5% by weight, calculated on the basis of the total weight of the polybutadiene grafted isoprene rubber, wherein:

the number-average molecular weight of the polybutadiene grafted isoprene rubber ranges from about $2\times10^5$ to about $5\times10^5$;

the molecular weight distribution of the polybutadiene grafted isoprene rubber ranges from about 3 to about 4;

the branching factor of the polybutadiene grafted isoprene rubber ranges from about 0.5 to about 0.98; and the polybutadiene grafted isoprene rubber in cis-1,4-structure is in an amount ranging from about 95% to about 99% by weight calculated on the basis of the total weight of the polybutadiene grafted isoprene rubber.

In some embodiments, the butadiene structural unit is in an amount ranging from about 1% to about 5% by weight, the isoprene structural unit is in an amount ranging from about 95% to about 99% by weight, the polybutadiene grafted isoprene rubber in cis-1,4-structure is in an amount ranging from about 97% to about 99% by weight, calculated on the basis of the total weight of the polybutadiene grafted isoprene rubber, and the branching factor ranges from about 0.6 to about 0.98.

In some embodiments, the Mooney viscosity of the polybutadiene grafted isoprene rubber ranges from about 60 to about 80.

In some embodiments, the number-average molecular weight of butadiene chain segments ranges from about 2,000 to about 10,000 and the molecular weight distribution of butadiene chain segments ranges from about 2 to about 3.

In other embodiments, the number-average molecular weight of butadiene chain segments ranges from about 3,000 to about 7,500 and the molecular weight distribution of butadiene chain segments ranges from about 2 to about 3.

In some embodiments, the butadiene chain segment in cis-1,4-structure is in an amount ranging from about 70% to about 80% by weight, and the butadiene chain segment in trans-1,4-structure is in an amount ranging from about 20% to about 30% by weight, calculated on the basis of the total weight of the polybutadiene grafted isoprene rubber.

Further disclosed herein is a process for preparing a polybutadiene grafted isoprene rubber, comprising a) conducting a first polymerization reaction with butadiene in a first organic solvent, in the presence of a first catalyst, to obtain a polybutadiene, wherein the number-average molecular weight of the polybutadiene ranges from about 2,000 to about 10,000 and the molecular weight distribution of the polybutadiene ranges from about 2 to about 3 and about 80 mol % to about 95 mol % of the polybutadiene contains conjugated double bonds;

b) conducting a second polymerization reaction between the polybutadiene in an amount ranging from about 0.5% to about 8% by weight, with an isoprene in an amount ranging from about 92% to about 99.5% by weight, in a second organic solvent, in the presence of a second catalyst, to obtain a polybutadiene grafted isoprene rubber, wherein the number-average molecular weight ranges from about $2 \times 10^5$ to about $5 \times 10^5$, the molecular weight distribution ranges from about 3 to about 4, and the branching factor ranges from about 0.5 to about 0.98.

In some embodiments, the first catalyst is chosen from nickel-based catalysts, present in an amount ranging from about 1 mol % to about 3 mol % calculated on the basis of the butadiene, wherein the amount of the first catalyst is calculated in nickel element.

In some embodiments, the nickel-based catalyst comprises nickel naphthenate, sesqui-ethyl aluminum and N-methylpyrrolidone.

In some embodiments, in the nickel-based catalyst, the molar ratio of nickel naphthenate to sesqui-ethyl aluminum to N-methylpyrrolidone is about 1:5-20:1-2.

In some embodiments, the first polymerization reaction is carried out in an inert atmosphere, the reaction temperature ranges from about 0 to about 60° C., the reaction pressure ranges from about 0.1 to about 0.5 MPa, and the reaction time period ranges from about 2 to about 10 h.

In some embodiments, the second catalyst is chosen from neodymium-based catalysts, present in an amount ranging from about $1 \times 10^{-4}$ to about $3 \times 10^{-4}$ moles calculated on the basis of 1 mol polybutadiene, wherein the amount of the second catalyst is calculated in neodymium element.

Further disclosed herein is a process for vulcanization of the polybutadiene grafted isoprene rubber.

Even further disclosed herein are vulcanizates and mixed composition prepared from the polybutadiene grafted isoprene rubber.

BRIEF DESCRIPTION OF THE DRAWINGS

The FIGURE shows the branching factors of components at different molecular weight levels in the polybutadiene grafted isoprene rubber prepared in an embodiment of the present disclosure.

As disclosed herein, the "branching factor" is a parameter characterizing the degree of branching; the branching factor of linear polymers is 1; the lower the branching factor is, the higher the degree of branching is. The value of the branching factor g can be calculated with the following formula:

$$g^{0.5} = ([\eta_b]/[\eta_l]),$$

wherein, $[\eta_b]$ is the intrinsic viscosity of the branched polymer, and $[\eta_l]$ is the intrinsic viscosity of linear polymer.

The Mooney viscosity disclosed herein is measured with an automatic Mooney viscometer (e.g., Model SMV-300, purchased from Shimadzu) with the method disclosed in GB/T1232.1-2000, wherein, the preheating time is 1 min., the rotation duration is 4 min., and the test temperature is 100° C.

The content of the cis-1,4-structure in the butadiene chain segment may range, for example, from 70% to 80% by weight, such as from 72% to 78% by weight, further such as from 74% to 76% by weight, and the content of trans-1,4-structure may range, for example, from 20% to 30% by weight, such as from 22% to 28% by weight, further such as from 24% to 26% by weight, calculated on the basis of the weight of butadiene.

Besides the cis-1,4-structure and trans-1,4-structure, the butadiene chain segments may contain butadiene chain segments in 1,2-structure; the sum of the components in the above different structures is 100%. The contents of other structures are not specified or measured in the present disclosure.

The number-average molecular weight and molecular weight distribution of polybutadiene, the content of cis-1,4-structure, and the content of trans-1,4-structure were determined during the first polymerization (step a), since it is generally agreed that the homopolymerization of butadiene essentially happens in step (a) and these values of the polybutadiene grafted isoprene rubber are essentially equal to the values of polybutadiene in step (a); and were used to represent the number-average molecular weight and molecular weight distribution of butadiene chain segments, content of cis-1,4-structure, and content of trans-1,4-structure in the polybutadiene grafted isoprene rubber, respectively.

The content of polybutadiene that contains conjugated double bonds can be measured by known methods. For example, to determine the content of polybutadiene that contains conjugated double bonds, a titration method may be used by conducting a Diels-Alder reaction with: polybutadiene and excess maleic anhydride, and subsequent saponification of the unreacted maleic anhydride, followed by the addition of $KIO_3$ and KI, and titrating the amount of maleic acid produced in the saponification reaction with $Na_2S_2O_3$ to determine the amount of maleic anhydride that participates in the Diels-Alder reaction, thereby calculating the number of moles (n1) of conjugated double bonds in the polybutadiene. Because the number of moles (n2) of the polybutadiene is:

n2=weight of added butadiene/number–average molecular weight of polybutadiene, the amount of polybutadiene that contains conjugated double bonds is calculated as follows:

number of moles of conjugated double bonds n1/number of moles of polybutadiene n2×100%.

In the present disclosure, the conditions of the polymerization reaction can be conventional conditions of polymerization reaction in the art. However, to overcome oxygen inhibition and obtain polybutadiene with high molecular weight and narrow molecular weight distribution, the first polymerization reaction (step a) and the second polymerization reaction (step b) are, for example, carried out in inert atmosphere, wherein the inert atmosphere refers to any gas or gas mixture that doesn't have chemical reaction with the reactants and product, such as nitrogen and one or more of the zero-group gasses in the periodic table of elements. The inert atmosphere can be maintained by filling any gas or gas mixture that doesn't have chemical reaction with the reactants and product into the reaction system. The conditions of the first polymerization reaction (step a) can include, for example, the reaction temperature ranging from about 0 to about 60° C., the reaction pressure ranging from about 0.1 to about 0.5 MPa, and the reaction time period ranging from about 2 to about 10 h. In some embodiments, the reaction temperature may range from about 20 to about 30° C., the reaction pressure may range from about 0.3 to about 0.4 MPa, and the reaction time period may range from about 2 to about 3 h. The pressure values disclosed herein are gage pressure values.

The weight ratio of polybutadiene to isoprene in the second polymerization reaction (step b) may vary. In some embodiments, the weight ratio of polybutadiene to isoprene ranges from about 0.01:1 to about 0.05:1.

The conditions of the second polymerization reaction (step b) can include, for example, the temperature ranging from about 10 to about 60° C., the pressure ranging from about 0.1 to about 0.4 MPa, and the reaction time period ranging from about 1 to about 5 h. In some embodiments, the temperature ranges from about 20 to about 40° C., the pressure ranges from about 0.2 to about 0.3 MPa, and the reaction time period ranges from about 2 to about 3 h.

The first catalyst may be any types and amount that can initiate butadiene polymerization by a reaction known in the art. In some embodiments, the first catalyst is a nickel-based catalyst.

The nickel-based catalyst comprises: at least one organic nickel compound that serves as the main component, chosen, for example, from nickel aliphatic carboxylates, nickel aromatic carboxylates, and nickel alicyclic carboxylates. The nickel aliphatic carboxylates can, for example, be chosen from nickel acetate, nickel octoate, and nickel acetylacetonate; the nickel aromatic carboxylate maybe chosen, for example, from nickel benzoate and nickel salicylate; and the nickel alicyclic carboxylates can, for example, be nickel naphthenate.

The nickel-based catalyst may further comprise at least one other organic metal compound, chosen, for example, from n-butyl lithium, triethyl aluminum, triisobutyl aluminum, aluminum diethyl monochloride, ethyl aluminum dichloride, and sesqui-ethyl aluminum; and at least one electron donor, chosen, for example, from boron trifluoride, hydrogen fluoride, titanium trifluoride, diphenyl oxide, and N-methyl pyrrolidone.

In one embodiment, the nickel-based catalyst comprises nickel naphthenate, sesqui-ethyl aluminum, and N-methylpyrrolidone, wherein the molar ratio of nickel naphthenate:sesqui-ethyl aluminum:N-methylpyrrolidone may vary, e.g., be about 1:5-20:1-2, such as 1:8-12:1.2-1.8, calculated on the basis of the number of moles of butadiene.

The amount of the first catalyst calculated in nickel element can range, for example, from 1 mol % to 3 mol %. The second catalyst may be any types and amount that can initiate polymerization of polybutadiene and isoprene by a reaction known in the art. In some embodiments, the second catalyst is a neodymium-based catalyst.

The neodymium-based catalyst is well known in the art. The neodymium-based catalyst may comprise:
 a. at least one neodymium compound chosen from neodymium carboxylate compound and neodymium phosphate/neodymium phosphonate compound;
 b. at least one aluminum alkyl compound: aluminum alkyl compounds in $AlR_3$ and/or $AlHR_2$, wherein, R is chosen from $C_1$-$C_6$ alkyl groups;
 c. at least one halogen-containing compound: chosen from aluminum alkyl halides in $AlR_2X$, sesqui-aluminum alkyl in $Al_2R_3X_3$, halogenated hydrocarbon in RX, and halogenated silicane in $R'_nX_{4-n}Si$, wherein, R is chosen from ethyl, n-propyl, isopropyl, n-butyl, isobutyl, tert-butyl, benzyl, and allyl groups, X is bromine or chlorine, R' is chosen from methyl, ethyl, n-propyl and isopropyl groups, and n is an integer ranging from 0 to 3;
 d. at least one conjugated diene: chosen from butadiene, isoprene, 1,3-pentylene, 1,3-hexadiene, and 2,3-dimethyl butadiene.

Exemplary neodymium carboxylate compounds are chosen from $C_1$-$C_{20}$ neodymium carboxylates, such as $C_6$-$C_{10}$ neodymium carboxylates.

The halogen-containing compound is chosen, for example, from aluminum diethyl monochloride, aluminum diisobutyl monochloride, sesqui-ethyl aluminum chloride, and sesqui-isobutyl aluminum chloride.

The conjugated diene is chosen, for example, from butadiene and isoprene.

Calculated on the basis of 1 mole of polybutadiene, the second catalyst calculated in neodymium element can be used in $1\times10^{-4}$–$3\times10^{-4}$ moles.

The contents of the components of the neodymium-based catalyst can be selected and vary within a wide range; for example, calculated on the basis of 1 mole of neodymium carboxylate or neodymium phosphate/neodymium phosphonate compound, the content of the conjugated diene can range from 20 to 100 moles, such as from 35 to 80 moles; the content of the aluminum alkyl compounds can range from 5 to 30 moles, such as from 6 to 25 moles; the content of the halogen-containing compound can range from 2 to 10 moles, such as from 2 to 4 moles.

The first organic solvent and the second organic solvent may be chosen from common organic solvents that can serve as reaction media in the art, as long as they are in liquid state under the polymerization conditions and will not participate in the polymerization reaction or have chemical interaction with the polymer. The first organic solvent and the second organic solvent can be selected independently from one or more of benzene, hexane, ethyl benzene, dimethylbenzene (including o-dimethylbenzene, m-dimethylbenzene, and p-dimethylbenzene), pentane and its isomers (e.g., n-pentane and iso-pentane), hexane and its isomers (e.g., n-hexane), heptane and its isomers (e.g., n-heptane), octane and its isomers (e.g., n-octane), and cyclohexane and raffinate oil. The amounts of the first organic solvent and the second organic solvent can be selected normally as specified in the art, and there is no special limitation on the amounts in the present disclosure. The amount of the first organic solvent is determined based on a butadiene concentration ranging from 2 to 10 mol/L, and the amount of the second organic solvent is determined based on a total polybutadiene and isoprene concentration ranging from 1 to 2 mol/L; thus, the polymerization reaction can be carried out steadily, and high production efficiency can be achieved.

In the present disclosure, in step (a) and step (b), after the reaction is completed, a variety of common methods known in the art can be used to deactivate the active polymer. For example, a termination agent can be added into the polymerization reaction system to deactivate the active polymer chains. The types and amount of the termination agent can be selected conventionally in the art, and there is no special limitation as to the types or amounts, as long as the termination agent can deactivate the polymer chains with active end groups. The termination agent may be selected from one or more of water, $C_1$-$C_6$ aliphatic alcohols, $C_4$-$C_{12}$ aliphatic carboxylic acids, and aryl polyhydroxylated compounds. The aryl polyhydroxylated compounds refer to compounds generated by displacing at least two hydrogen atoms on the benzene ring with hydroxyl radicals. For example, the termination agent is chosen from water, methanol, ethanol, isopropanol, and 2,6-ditertiary butyl-p-dihydroxy benzene; such as, in step (a), the termination agent is ethanol; in step (b), the termination agent is 2,6-ditertiary butyl-p-dihydroxy benzene. There is no special limitation to the amount of the termination agent disclosed herein, as long as the amount of the termination agent is enough to deactivate the active substances in the polymerized product.

Further disclosed herein is polybutadiene grafted isoprene rubber prepared by the method described above.

Even further disclosed herein are mixed compositions and vulcanizates prepared from the polybutadiene grafted isoprene rubber described above.

For differentiation purpose, in the present disclosure, the crude rubber obtained in the polymerization reaction is referred to as polybutadiene grafted isoprene rubber (i.e., crude rubber), the product obtained from the crude rubber by vulcanization is referred to as a "vulcanizate" or the "vulcanized form", and the product obtained from the crude rubber by compounding is referred to as mixed composition.

The main difference between the polyisoprene mixed composition disclosed herein and other polyisoprene mixed compositions lies in: the polyisoprene mixed composition disclosed herein is prepared from polyisoprene grafted isoprene rubber disclosed herein, and the preparation method can be selected from known methods in the prior art. For example, the polyisoprene mixed composition can be obtained by internally mixing the polyisoprene with a rubber mixing additive. The types and amount of the rubber mixing additive can be determined by one of ordinary skill in the art. For example, the rubber mixing additive may comprise at least one vulcanizing agent and carbon black. The specific mixing operations and conditions can also be determined by one of ordinary skill in the art.

There is no special limitation to the types and amounts of the vulcanizing agent and specific vulcanization operations, that is to say, they may be selected appropriately according to the specific application scenario of the rubber composition by one of ordinary skill in the art. For example, when the rubber composition disclosed herein is applied in the automobile tire field, the total weight of the vulcanizing agent may range, for example, from about 0.5 to about 3 weight parts, such as from about 0.6 to about 2.5 weight parts, on the basis of 100 weight parts polybutadiene grafted isoprene rubber. The vulcanizing agent may be selected from, for example, sulphur, selenium, tellurium, benzoyl peroxide, ethyl urethane, and 2,5-dimethyl-2,5-di(tertiary butyl peroxy)-hexane.

The vulcanization process may proceed in existence of at least one vulcanization accelerator. The vulcanization accelerator may be any common vulcanization accelerator in the art. For example, the vulcanization accelerator can be selected from zinc oxide, magnesium oxide, and stearic acid. The amount of the vulcanization accelerator can be selected appropriately according to the types of the vulcanizing agent.

The vulcanizate disclosed herein can further comprise at least one commonly used additive in the rubber industry, chosen, for example, from anti-aging agents and filling agents, so as to improve the properties of the synthetic rubber or introduce new properties or functions into the synthetic rubber. For example, an anti-aging agent can be added to the product that is added with the polymerization termination agent, to introduce favorable anti-aging property into the synthetic rubber. The types and amount of the additive may be selected from those known in the art. In the following examples and comparative examples, the microstructure of polybutadiene grafted isoprene rubber is measured with a Bruker Tensor 27 infrared spectrometer purchased from German and a Bruker 400 MHz NMR (Nuclear Magnetic Resonance) spectrometer purchased from German; the Mooney viscosity is measured with a SMV-300 automatic Mooney viscometer from Shimadzu (Japan) with the method specified in GB1232.1-2000, wherein, the preheating time is 1 min., the rotation duration is 4 min., and the test temperature is 100° C.; the molecular weight and molecular weight distribution are measured with a LC-10AT gel permeation chromatograph (GPC) from Shimadzu, wherein, THF is used as the fluid phase, narrowly distributed polystyrene is used as a standard sample, and the test temperature is 25° C. The branching factor is measured with a combined gel permeation chromatograph-laser light scattering spectrometer-online viscosity meter system as follows: firstly, carrying out fractionation of the polymer by the chromatographic column of GPC; secondly, testing each fraction with the laser light scattering spectrometer and online viscosity meter; finally, obtaining the parameters related to the properties of the polymer solution, wherein, the GPC is a 1100 Series GPC from Agilent (USA). The laser light scattering spectrometer and online viscosity meter are from Wyatt (USA), the model of the former is DAWN HELEOS, and the model of the latter is ViscoStar viscometer. The flow rate of the solvent THF is 1 ml/min.

In the following examples and comparative examples, the content of polybutadiene that contains conjugated double bonds is measured with the following method: conducting excessive maleic anhydride to a Diels-Alder reaction with polybutadiene, conducting the unreacted maleic anhydride to a saponification reaction with water, add $KIO_3$ and KI, and titrating the amount of maleic acid produced in the saponification reaction with $Na_2S_2O_3$ to determine the amount of maleic anhydride that participates in the Diels-Alder reaction, and thereby deducing the number of moles n1 of conjugated double bonds in the polybutadiene; since the number of moles n2 of polybutadiene is: n2=weight of added butadiene/number-average molecular weight of polybutadiene, the content of polybutadiene that contains conjugated double bonds is: number of moles n1 of conjugated double bonds/number of moles n2 of polybutadiene×100%.

The branching factor g can be calculated with the following formula:

$$g^{0.5}=([\eta_b]/[\eta_l]),$$

where, $[\eta_b]$ is the intrinsic viscosity of the branched polymer, and $[\eta_l]$ is the intrinsic viscosity of the linear polymer (in comparative example 1). With the combined laser light scattering spectrometer-viscosity meter-GPC system, carrying out fractionation of the polymer with the GPC unit firstly, and then measuring the intrinsic viscosity values of different polymer fractions $[\eta_b]$ and $[\eta_l]$ with the online viscosity meter.

The content of butadiene structural units in the polybutadiene grafted isoprene rubber is calculated with the following formula:

Content of butadiene structural units(wt. %)=input amount of polybutadiene/amount of obtained polybutadiene grafted isoprene rubber×100%

Content of isoprene structural units=100 wt.%−content of butadiene structural units

EXAMPLES

The present disclosure is illustrated by the following non-limiting examples.

Preparation of Nickel-Based Catalyst

Under nitrogen at 10° C., 0.3 mol nickel naphthenate (purchased from Shanghai Minghuan Chemical Co., Ltd., the same below), 3 mol sesqui-ethyl aluminum chloride, 0.45 mol N-methylpyrrolidone (NMP), and 2 L hexane were mixed in a dry vessel to a homogeneous state for 30 minutes, to obtain a nickel-based catalyst at 0.15 mol/L concentration (calculated in nickel element).

Preparation of Neodymium-Based Catalyst

Under nitrogen, 180 ml of 0.05 mol/L hexane solution of neodymium neodecanoate, 45 ml (0.45 mol) of isoprene, and 1 kg of hexane were mixed to a homogeneous state. The temperature was adjusted to 10° C., 34 ml of 0.8 mol/L hexane solution of aluminum diethyl monochloride was added and the reaction was carried out for 15 min.; 50 ml of 2 mol/L hexane solution of triisobutyl aluminum was added and the reaction was carried out for an additional 24 h, to obtain a neodymium-based catalyst at 0.005 mol/L concentration (calculated in neodymium element).

Example 1

(1) Preparation of Polybutadiene

Under nitrogen, 500 ml of the nickel-based catalyst prepared in the example above and 250 ml hexane solution containing 162 g (3 mol) of butadiene were added into a polymerization vessel and agitated and the reaction was maintained for 10 h at 20° C. and at 0.1 MPa. The resulting polymer solution was discharged from the vessel, 100 ml of ethanol was added to terminate the reaction. The polymer mixture was discharged from the vessel and precipitated, washed, and dried, to obtain 120 g of polybutadiene. Calculated on the basis of the total weight of the polybutadiene, the content of cis-1,4-structure in the polybutadiene was determined to be 75.3% by weight, and the content of trans-1,4-structure was determined to be 24.2% by weight. The number-average molecular weight of the polybutadiene=3,200. Molecular weight distribution=2.2. Content of polybutadiene that contains conjugated double bonds=85 mol %.

(2) Preparation of Polybutadiene Grafted Isoprene Rubber

Under nitrogen, 1,500 g of hexane, 300 g of isoprene, solution formed by 5.5 g of the polybutadiene prepared in step (1) above and 100 g of hexane, and 150 ml of the neodymium-based catalyst prepared above were added into a 5 L polymerization vessel, agitated and the reaction was maintained for 3 h at 20° C. and at 0.2 MPa; the resulting polymer mixture was discharged to obtain the polymer solution from the vessel, and 300 ml of a 1% by weight ethanol solution of 2,6-ditertiary butyl-p-dihydroxy benzene was added to terminate the reaction. The resulting polymer mixture was then precipitated, washed, and dried to obtain 222 g polybutadiene grafted isoprene rubber. Calculated on the basis of the total weight of the polybutadiene grafted isoprene rubber, the content of butadiene structural units was determined to be 2.48% by weight, the content of isoprene structural units was determined to be 97.52% by weight, the content of cis-1,4-structure in the polybutadiene grafted isoprene rubber was determined to be 98.0% by weight, the number-average molecular weight of the polybutadiene grafted isoprene rubber=3.5×$10^5$, the molecular weight distribution=3.11, and the Mooney viscosity=72.

Comparative Example 1

Preparation of Isoprene Rubber

Under nitrogen at 20° C., 2,000 g of hexane, 300 g of isoprene, 150 ml of neodymium-based catalyst prepared in the example above were added into a 5 L polymerization vessel, and agitated and the reaction was maintained for 2 h at 20° C. and at 0.2 MPa; the resulting polymer solution was discharged from the vessel and 300 ml of 1% by weight ethanol solution of 2,6-ditertiary butyl-p-dihydroxy benzene was added to terminate the reaction. The resulting polymer mixture was then precipitated, washed, and dried, to obtain 243 g isoprene rubber. Calculated on the basis of the total weight of the isoprene rubber, the content of cis-1,4-structure in the isoprene rubber was determined to be 98.2% by weight; the number-average molecular weight of the isoprene rubber was determined to be 2×$10^5$, the molecular weight distribution=3.74, the Mooney viscosity=87, and the branching factor=1.

Example 2

(1) Preparation of Polybutadiene

Under nitrogen, 1,000 ml nickel-based catalyst prepared from the example above and 500 ml hexane solution containing 486 g (9 mol) butadiene was added into a polymerization vessel, and agitated and the reaction was maintained for 5 h at 30° C. and at 0.3 MPa. The resulting polymer solution was discharged from the vessel, and 100 ml ethanol was added to terminate the reaction, and then the resulting polymer mixture was precipitated, washed, and dried, to obtain 333 g polybutadiene. Calculated on the basis of the total weight of the polybutadiene, the content of cis-1,4-structure in the polybutadiene was determined to be 74.2% by weight, and the content of trans-1,4-structure was determined to be 25.8% by weight; the number-average molecular weight of the polybutadiene=5,600, the molecular weight distribution=2.7, and the content of polybutadiene that contains conjugated double bonds=90 mol %.

(2) Preparation of Polybutadiene Grafted Isoprene Rubber

Under nitrogen, 1,900 g of hexane, 300 g of isoprene, solution formed by 7.5 g of polybutadiene prepared in step (1) above and 100 g of hexane, and 176 ml neodymium-based catalyst prepared in example above were added into a 5 L polymerization vessel, and agitated and the reaction was maintained for 2 h at 30° C. and at 0.3 MPa. The resulting polymer mixture was discharged from the vessel to obtain the polymer solution and a 300 ml of 1% by weight ethanol solution of 2,6-ditertiary butyl-p-dihydroxy benzene was added to terminate the reaction. The resulting polymer mixture was then precipitated, washed, and dried, to obtain 213 g polybutadiene grafted isoprene rubber. Calculated on the basis of the total weight of the polybutadiene grafted isoprene rubber, the content of butadiene structural units was determined to be 3.52% by weight, the content of isoprene structural units was determined to be 96.48% by weight, the content of cis-1,4-structure in the polybutadiene grafted isoprene rubber was determined to be 97.7% by weight; the number-average molecular weight of the polybutadiene grafted isoprene rubber=$3.2\times10^5$, the molecular weight distribution=3.48, and the Mooney viscosity=69.

Comparative Example 2

Preparation of Butadiene Isoprene Copolymer

Under nitrogen, at 20° C., 2,000 g of hexane, 162 g (3 mol) hexane solution of butadiene, 204 g (3 mol) isoprene, and 204 ml neodymium-based catalyst prepared in the example above were added into a 5 L polymerization vessel, and agitated and the reaction was maintained for 2 h. The resulting polymer mixture was discharged from the vessel and 100 ml of ethanol solution was added to terminate the reaction. The resulting polymer mixture was then precipitated, washed, and dried, to obtain 340 g of a random butadiene-isoprene copolymer. For the resulting product, the number-average molecular weight=$2.8\times10^5$, the molecular weight distribution=3.52, and the Mooney viscosity=82.

Example 3

(1) Preparation of Polybutadiene

Under nitrogen, 600 ml of the nickel-based catalyst prepared in the example above and 500 ml of hexane solution containing 486 g (9 mol) butadiene were added into a polymerization vessel and agitated, and the reaction was maintained for 2 h at 40° C. and at 0.5 MPa. The resulting polymer mixture was discharged from the vessel and 100 ml ethanol was added to terminate the reaction. The resulting polymer mixture was then precipitated, washed, and dried, to obtain 335 g polybutadiene. Calculated on the basis of the total weight of the polybutadiene, the content of cis-1,4-structure in the polybutadiene was determined to be 73.8% by weight, and the content of trans-1,4-structure was determined to be 26.2% by weight. The number-average molecular weight of the polybutadiene=7,200, the molecular weight distribution=2.9, and the content of the polybutadiene that contains conjugated double bonds=80 mol %.

(2) Preparation of Polybutadiene Grafted Isoprene Rubber

Under nitrogen, 1,500 g hexane, 300 g isoprene, solution formed by 10 g polybutadiene prepared in step (1) above and 100 g hexane, and 88 ml neodymium-based catalyst prepared in the example above were added into a 5 L polymerization vessel, and agitated and the reaction was maintained for 1 h at 50° C. and at 0.4 MPa. The resulting polymer mixture was discharged from the vessel and 300 ml 1% by weight ethanol solution of 2,6-ditertiary butyl-p-dihydroxy benzene was added to terminate the reaction. The resulting polymer mixture was then precipitated, washed, and dried, to obtain 226 g polybutadiene grafted isoprene rubber. Calculated on the basis of the total weight of the polybutadiene grafted isoprene rubber, the content of butadiene structural units was determined to be 4.42% by weight, the content of isoprene structural units was determined to be 95.58% by weight, and the content of cis-1,4-structure in the polybutadiene grafted isoprene rubber was determined to be 98.2% by weight. The number-average molecular weight of the polybutadiene grafted isoprene rubber=$3.8\times10^5$, the molecular weight distribution=3.7, and the Mooney viscosity=73.

Comparative Example 3

Preparation of Isoprene Rubber

Under nitrogen, at 20° C., 2,000 g hexane, 300 g isoprene, and 150 ml neodymium-based catalyst prepared in the example above were added into a 5 L polymerization vessel, and agitated and the reaction was maintained for 2 h at 20° C. and at 0.2 MPa. The resulting polymer mixture was discharged from the vessel, and 300 ml 1% by weight ethanol solution of 2,6-ditertiary butyl-p-dihydroxy benzene was added to terminate the reaction. To the resulting polymer mixture, 5.5 g polybutadiene prepared in Example 1 above was added. The resulting polymer mixture was then precipitated, washed, and dried, to obtain 250 g isoprene rubber. Calculated on the basis of the total weight of the isoprene rubber, the content of cis-1,4-structure in the isoprene rubber was determined to be 98.0% by weight, the isoprene rubber was in bimodal distribution, and the number-average molecular weight values at the peaks=$2\times10^5$ and $3\times10^3$ respectively.

Example 4

Preparation of Polybutadiene Grafted Isoprene Rubber

The polybutadiene grafted isoprene rubber was prepared according to Example 1 above, except that 3 g polybutadiene prepared in step (1) was added and 300 g isoprene in step (2) was added, to obtain 222 g polybutadiene grafted isoprene rubber. Calculated on the basis of the total weight of the polybutadiene grafted isoprene rubber, the content of butadiene structural units was determined to be 1.35% by weight, and the content of isoprene structural units was determined to be 98.65% by weight, and the content of cis-1,4-structure in the polybutadiene grafted isoprene rubber was determined to be 98% by weight. The number-average molecular weight of the polybutadiene grafted isoprene rubber=$2.8\times10^5$, the molecular weight distribution=3.6, and the Mooney viscosity=78.

Example 5

(1) Preparation of Polybutadiene

The polybutadiene was prepared according to the method described in Example 1, except that 250 ml hexane solution containing 162 g (3 mol) butadiene was replaced with a 250 ml hexane solution containing 54 g (1 mol) butadiene, to obtain 34 g polybutadiene; calculated on the basis of the total weight of the polybutadiene, the content of cis-1,4-structure in the polybutadiene was determined to be 78.2% by weight, and the content of trans-1,4-structure was determined to be 21.8% by weight. The number-average molecular weight of the polybutadiene=1,200, the molecular weight distribution=2.3, and the content of polybutadiene that contains conjugated double bonds=82 mol %.

(2) Preparation of Polybutadiene Grafted Isoprene Rubber

Under nitrogen, 1,500 g hexane, 300 g isoprene, solution formed by 5.5 g polybutadiene and 100 g hexane, and 150 ml neodymium-based catalyst prepared in the example above were added into a 5 L polymerization vessel and agitated and the reaction was maintained for 3 h at 20° C. and at 0.2 MPa. The resulting polymer mixture was discharged from the vessel and 300 ml 1% by weight ethanol solution of 2,6-ditertiary butyl-p-dihydroxy benzene was added to terminate the reaction. The resulting polymer mixture was then precipitated, washed, and dried, to obtain 228 g polybutadiene grafted isoprene rubber. Calculated on the basis of the total weight of the polybutadiene grafted isoprene rubber, the content of butadiene structural units was determined to be 2.41% by weight, and the content of isoprene structural units was determined to be 97.59% by weight, the content of cis-1,4-structure in the polybutadiene grafted isoprene rubber was determined to be 98.1% by weight. The number-average molecular weight of the polybutadiene grafted isoprene rubber=$3.7 \times 10^5$, the molecular weight distribution=3.2, and the Mooney viscosity=75.

The branching factors of the polybutadiene grafted isoprene rubber fractions at varying molecular weight levels in the resulting polybutadiene grafted isoprene rubber product in Examples 1-5 are shown in the FIGURE. It is seen from the FIGURE, the branching factor of the polybutadiene grafted isoprene rubber disclosed herein ranges from about 0.6 to about 0.98, and the degree of branching is adjustable within a range.

Test Example

The compounding of the polybutadiene grafted isoprene rubber (crude rubber) compositions obtained in the examples above was carried out in a compounding mill at 70±5° C. and was then subjected to vulcanization, which was carried out for approximately 20 min. at 145° C. with 100 g crude rubber, 45 g carbon black, 2 g sulfur, 0.9 g accelerator CZ, 4 g stearic acid, and 5 g zinc oxide. The vulcanizate was manufactured into Type 1 sample to measure mechanical properties with the method specified in GB/T528-1998.

The physical and mechanical properties of the vulcanizate are shown in table 1.

TABLE 1

|  | Examples | | | | | | | |
| --- | --- | --- | --- | --- | --- | --- | --- | --- |
|  | Example 1 | Comparative Example 1 | Example 2 | Comparative Example 2 | Example 3 | Comparative Example 3 | Example 4 | Example 5 |
| Tensile strength (MPa) | 26.0 | 25.9 | 26.8 | 16.0 | 27.2 | 25.6 | 26.3 | 26.2 |
| Maximum elongation (%) | 505 | 528 | 463 | 450 | 600 | 490 | 538 | 500 |
| Tensile strength at 300% fixed elongation (MPa) | 14.0 | 13.2 | 15.1 | 10.2 | 12.5 | 13.0 | 13.4 | 12.9 |
| Tearing strength (kN/m) | 72.7 | 45.0 | 71.0 | 50.0 | 75.8 | 43.2 | 65.6 | 52.0 |

Comparison between Examples 1-4 and Comparative Example 1 shows that the vulcanizate obtained from the polybutadiene grafted isoprene rubber disclosed herein has outstanding mechanical properties, the tensile strength, maximum elongation, and tensile strength at 300% elongation are comparative to those of rare earth isoprene rubber, and the tearing strength is higher by 30% than the tearing strength of rare earth isoprene rubber.

What is claimed is:

1. A polybutadiene grafted isoprene rubber, comprising
   a) butadiene structural units in an amount ranging from about 0.5% to about 8% by weight; and
   b) isoprene structural units in an amount ranging from about 92% to about 99.5% by weight, calculated on the basis of the total weight of the polybutadiene grafted isoprene rubber; wherein:
   the number-average molecular weight of the polybutadiene grafted isoprene rubber ranges from about $2 \times 10^5$ to about $5 \times 10^5$;
   the molecular weight distribution of the polybutadiene grafted isoprene rubber ranges from about 3 to about 4;
   the branching factor of the polybutadiene grafted isoprene rubber ranges from about 0.5 to about 0.98; and
   the polybutadiene grafted isoprene rubber in cis-1,4-structure is in an amount ranging from about 95% to about 99% by weight, calculated on the basis of the total weight of the polybutadiene grafted isoprene rubber.

2. The polybutadiene grafted isoprene rubber according to claim 1, wherein, calculated on the basis of the total weight of the polybutadiene grafted isoprene rubber, the butadiene structural unit is in an amount ranging from about 1% to 5% by weight, the isoprene structural units is in an amount ranging from about 95% to 99% by weight, the polybutadiene grafted isoprene rubber in cis-1,4-structure is in an amount ranging from about 97% to about 99% by weight, and the branching factor ranges from about 0.6 to about 0.98.

3. The polybutadiene grafted isoprene rubber according to claim 1, wherein the Mooney viscosity of the polybutadiene grafted isoprene rubber ranges from about 60 to about 80, and the Mooney viscosity is measured with the method disclosed in GB/T1232.1-2000, wherein, the preheating time is 1 min., the rotation duration is 4 min., and the test temperature is 100° C.

4. The polybutadiene grafted isoprene rubber according to claim 1, wherein the number-average molecular weight of butadiene chain segments ranges from about 2,000 to about 10,000 and the molecular weight distribution of butadiene chain segments ranges from about 2 to about 3.

5. The polybutadiene grafted isoprene rubber according to claim 4, wherein the number-average molecular weight of butadiene chain segments ranges from about 3,000 to about 7,500 and the molecular weight distribution of butadiene chain segments ranges from about 2 to about 3.

6. The polybutadiene grafted isoprene rubber according to claim 1, wherein the butadiene chain segments in cis-1,4-structure is in an amount ranging from about 70% to about 80% by weight, and the butadiene chain segments in trans-1,4-structure is in an amount ranging from about 20% to about 30% by weight, calculated on the basis of the total weight of the polybutadiene grafted isoprene rubber.

7. A process for preparing a polybutadiene grafted isoprene rubber, comprising:
   a) conducting a first polymerization reaction with butadiene in a first organic solvent, in the presence of a first catalyst, to obtain a polybutadiene, wherein the number-average molecular weight of the polybutadiene ranges from about 2,000 to about 10,000 and the molecular weight distribution ranging from about 2 to about 3 and 80 mol % to 95 mol % of the polybutadiene contains conjugated double bonds;

b) conducting a second polymerization reaction between the polybutadiene in an amount ranging from about 0.5% to about 8% by weight, and an isoprene in an amount ranging from about 92% to about 99.5% by weight in a second organic solvent, in the presence of a second catalyst to obtain a polybutadiene grafted isoprene rubber, wherein the number-average molecular weight ranges from about $2\times10^5$ to about $5\times10^5$, the molecular weight distribution ranges from about 3 to about 4, and the branching factor ranges from about 0.5 to about 0.98.

8. The process according to claim 7, wherein the first catalyst is a nickel-based catalyst, present in an amount ranging from about 1 to about 3 mol %, calculated on the basis of the butadiene, wherein the amount of the first catalyst is calculated in nickel element.

9. The process according to claim 8, wherein the nickel-based catalyst comprises nickel naphthenate, sesqui-ethyl aluminum and N-methylpyrrolidone.

10. The process according to claim 9, wherein the molar ratio of nickel naphthenate:sesqui-ethyl aluminum:N-methylpyrrolidone is about 1:5-20:1-2.

11. The process according to claim 7, wherein the first polymerization reaction is carried out in an inert atmosphere, the reaction temperature ranges from about 0 to about 60° C., the reaction pressure ranges from about 0.1 to about 0.5 MPa, and the reaction time period ranges from about 2 to about 10 h.

12. The process according to claim 7, wherein the second catalyst is a neodymium-based catalyst present in an amount ranging from about $1\times10^{-4}$ to about $3\times10^{-4}$ moles calculated on the basis of 1 mol polybutadiene, wherein the amount of the second catalyst is calculated in neodymium element.

13. The process according to claim 12, wherein the neodymium-based catalyst comprises:

a. at least one neodymium compound chosen from neodymium carboxylates, neodymium phosphates, and neodymium phosphonates, b. at least one aluminum alkyl compound chosen from aluminum alkyl compounds in $AlR_3$ and $AlHR_2$, wherein R is chosen from $C_1$-$C_6$ alkyl groups;

c. at least one halogen-containing compound chosen from aluminum alkyl halides in $AlR_2X$, sesqui-aluminum alkyl compounds in $Al_2R_3X_3$, halogenated hydrocarbons in RX, and halogenated silicanes in $R'_nX_{4-n}Si$, wherein R is chosen from ethyl, propyl, isopropyl, butyl, isobutyl, tertiary butyl, benzyl, and allyl groups, X is chosen from bromine and chlorine, R' is chosen from methyl, ethyl, propyl, and isopropyl groups, and n is an integer ranging from 0 to 3; and d. at least one conjugated diene chosen from butadiene, isoprene, 1,3-pentylene, 1,3-hexadiene, and 2,3-dimethyl butadiene.

14. The process according to claim 13, wherein, calculated on the basis of 1 mol of the at least one neodymium compound, the content of the at least one conjugated diene ranges from about 20 to about 100 moles, the content of the at least one aluminum alkyl compound ranges from about 5 to about 30 moles, and the content of the at least one halogen-containing compound ranges from about 2 to about 10 moles.

15. The process according to claim 7, wherein in step (b), the weight ratio of the polybutadiene to the isoprene ranges from about 0.01:1 to about 0.05:1.

16. The process according to claim 7, wherein in step (b), the polymerization is conducted in an inert atmosphere at a temperature ranging from about 10 to about 60° C., at a pressure ranging from about 0.1 to about 0.4 MPa, for a time period ranging from about 1 to about 5 h.

17. Vulcanizate prepared from the polybutadiene grafted isoprene rubber according to claim 1.

18. Vulcanizate prepared from the polybutadiene grafted isoprene rubber according to claim 3.

19. Vulcanizate prepared from the polybutadiene grafted isoprene rubber according to claim 6.

20. A composition prepared from the polybutadiene grafted isoprene rubber according to claim 1.

* * * * *